INVENTOR.
JOHN R. CRIBBS
BY Knox & Knox

INVENTOR.
JOHN R. CRIBBS
BY
Knox & Knox

July 26, 1966

J. R. CRIBBS 3,262,435

AUTOMATIC VARIABLE VALVE TIMING DEVICE FOR
INTERNAL COMBUSTION ENGINES

Filed May 25, 1964

INVENTOR.
JOHN R. CRIBBS
BY Knox & Knox

United States Patent Office

3,262,435
Patented July 26, 1966

3,262,435
AUTOMATIC VARIABLE VALVE TIMING DEVICE
FOR INTERNAL COMBUSTION ENGINES
John R. Cribbs, 6034 Soledad Mountain Road, La Jolla, Calif.
Filed May 25, 1964, Ser. No. 370,761
9 Claims. (Cl. 123—90)

This application is a continuation-in-part of my application Serial Number 274,131, filed April 19, 1963, now abandoned.

This invention relates generally to internal combustion engine valve timing and particularly to a device that varies valve timing as engine speed varies.

*Background*

In internal combustion engines, combustion cylinder fuel intake and gas exhaust valves are opened and closed by cams mounted on a camshaft driven by the engine crankshaft. For smooth and efficient operation, the valves are adjusted and timed to open and close in proper sequence and to remain open or closed at proper intervals. Normally the intake and exhaust valves are timed to open and close at different times but to remain open simultaneously during a short overlapping period centered on the top dead center of the piston upward stroke.

In the usual method for adjusting valve timing, the crankshaft, camshaft, and valves are placed in relative positions so that the intake valve opens before and the exhaust valve closes after the piston passes through top dead center, the valves opening and closing at points an equal number of degrees on both sides of top dead center. At the bottom of the stroke, the valve sequence is reversed, the exhaust valve opening before and the intake valve closing after the piston passes through bottom dead center, the valves opening and closing at points an equal number of degrees on both sides of bottom dead center. This method of adjustment, called "split overlap," provides optimum but not maximum efficiency at all engine speeds.

If the timing is adjusted so that the overlapping period is not centered on top dead center, engine performance efficiency shifts toward lower or higher speeds dependent on the direction off center, with a reduction of efficiency in the opposite direction.

When maximum performance at low speeds is desired, the timing is advanced by adjusting the timing mechanism so that the intake valve opens earlier or at a greater number of degrees before top dead center after the piston passes through bottom dead center. At the same time, the exhaust valve closes and opens earlier by the same number of degrees. Earlier closing of the intake valve after a downward intake stroke reduces reverse pumping action, resulting in increased torque at low speeds where maximum torque is needed. Consequently, advanced timing improves engine performance and efficiency at low speeds.

When smooth performance at high speeds is desired, the timing is retarded by adjusting the timing mechanism so that the intake valve opens later or at a lesser number of degrees before the piston reaches top dead center and all other valve operations shift an equal number of degrees in the same direction. Later closing of the intake valve after a downward intake stroke, increases cylinder filling, since at higher speeds the column of incoming gases acquires inertia. This results in increased power at high speeds. Detonation tendencies are also reduced. Consequently, retarded timing improves engine performance and efficiency at high speeds.

Stock passenger car camshafts, cams, and valves are designed to stress smooth running and fairly efficient performance at low and medium speeds, providing satisfactory operation at all speeds with reduced performance at very low and high speeds. Consequently, split overlap timing, as described above, provides optimum but not maximum efficiency at all speeds in stock passenger cars.

From the foregoing discussion, it follows that engine performance may be improved by a valve timing mechanism automatically capable of shifting with changes in engine speed from split overlap timing at medium speeds to advanced timing at slow speeds and retarded timing at high speeds.

The instant invention is a device with this capability, comprising a camshaft gear that changes angular position relative to angular position of the camshaft, advancing the camshaft at low speeds to advance timing, retracting the camshaft at high speeds to retard timing and maintaining a split overlap timing position at medium speeds.

*Objects*

It is a principal object of this invention to provide maximum engine performance and efficiency in an internal combustion engine at all engine speeds.

It is another object of this invention to provide a valve timing device for internal combustion engines that varies the timing automatically in proportion to engine speed.

It is still another object of this invention to provide an automatic valve timing device for internal combustion engines that, compared with the prior art, produces reduced minimum engine speed with quieter operation and smoother idling, reduced exhaust gases at idling speeds, and increased economy and efficiency at all speeds.

With these and other objects definitely in view, this invention consists in the novel combination and arrangement of elements as will be hereinafter fully described in the specification, particularly pointed out in the claims, and illustrated in the drawings that form a material part of this disclosure, and in which:

*Detailed description*

Figure 1:
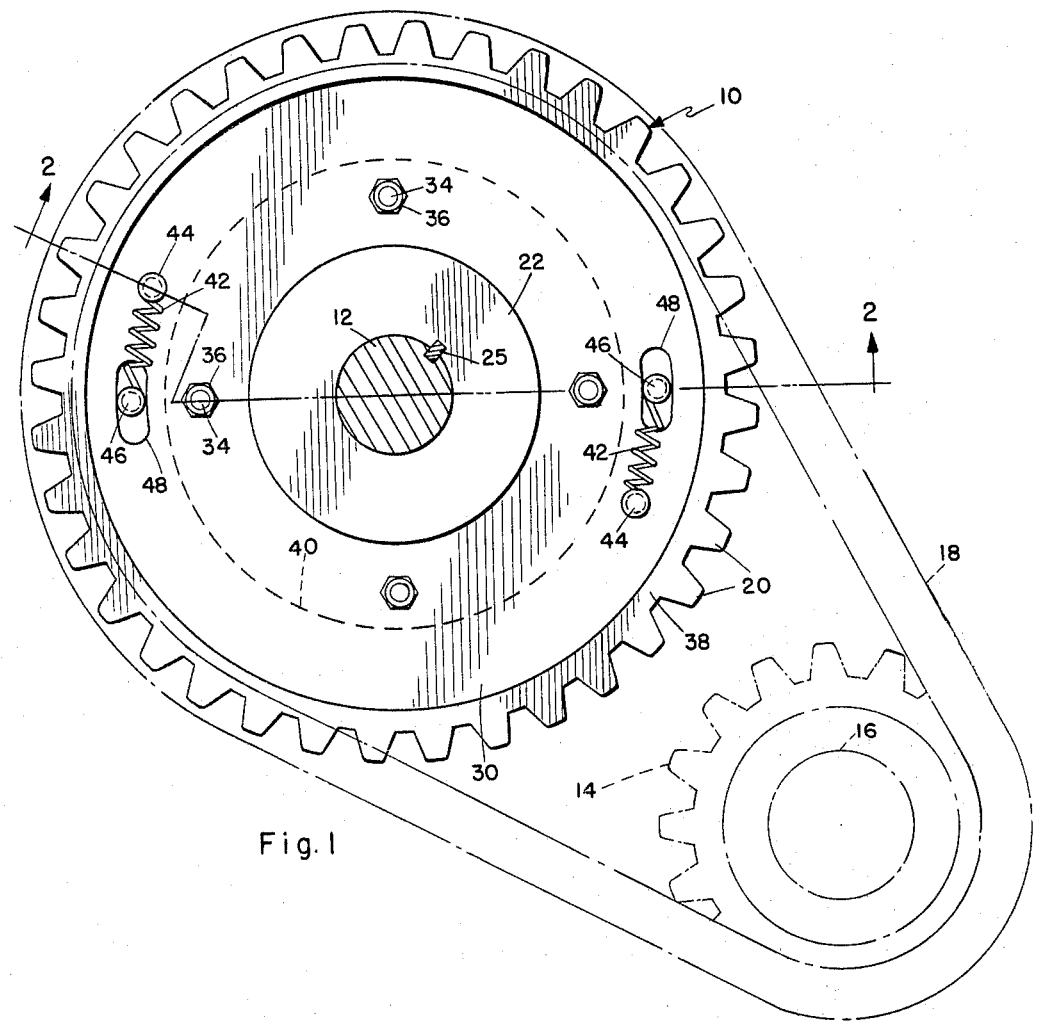
FIGURE 1 is a front elevation view of a camshaft gear incorporating the variable timing means, a driveshaft gear and driving chain being indicated in broken line.

In FIGURE 1, camshaft gear assembly 10 is shown mounted on camshaft 12, crankshaft gear 14 is mounted on crankshaft 16, and gears 10 and 14 are operatively engaged by timing chain 18. Alternatively, gears 10 and 14 could be engaged directly or by an intermediate gear, dispensing with timing chain 18, or by a pulley and belt driving connection.

Figure 2:
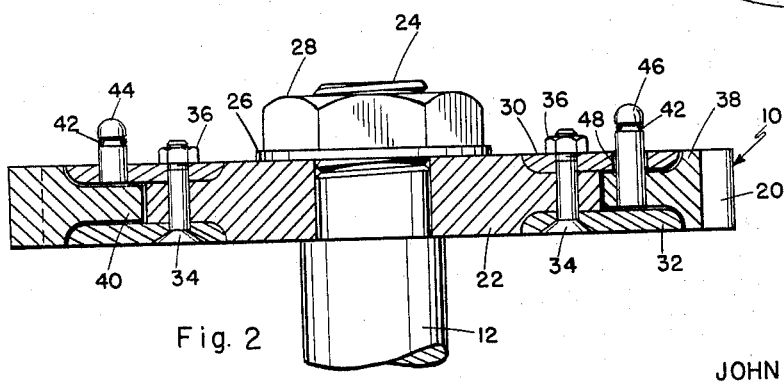
FIGURE 2 is a sectional view taken on line 2—2 of FIGURE 1.

In the prior art, the camshaft gear is a unitary member that transfers rotation directly to the camshaft. In the instant invention, as illustrated in FIGURES 1 and 2, camshaft gear assembly 10 is composed of four separate members: hub 22, annular face plate 30, annular back plate 32, and annular toothed gear 38.

Hub 22 is rigidly attached to camshaft 12 by means of threaded portion 24, Woodruff key or the like 25, washer 26, and nut 28. Annular face plate 30 and annular back plate 32 are attached to hub 22 by screws 34 and nuts 36, although rivets or the like may be used. Annular toothed gear 38 is mounted for limited rotational slippage by means of inner circumferential flange 40 between annular face plate 30 and annular back plate 32.

As thus far described, camshaft 12 and gear 38 are free to rotate independently.

Automatic valve timing in accordance with engine speed is provided by the method of connecting face plate 30 to gear 38. Bias spring 42 is connected at one end to pin 44 in face plate 30 and at the other end to pin 46 in flange 40 of gear 38. Pin 46 protrudes through arcuate slot 48 in face plate 30. With spring 42 thus attached, it is apparent that rotating gear 38 transfers rotation by means of spring 42 to face plate 30, thence to hub 22 and camshaft 12. It is further apparent that spring 42 will expand and contract as the rotation speed of gear 38 increases and decreases due to friction and inertia of the camshaft 12, it being recalled that the gears 14 and 38 are positively driven.

As illustrated, pin 46 occupies an intermediate position in arcuate slot 48, corresponding to a medium speed position with gear 38 rotating. With rotation stopped, spring 42 would contract and draw pin 46 to the end of arcuate slot 48 nearer to pin 44. With maximum rotation speed, spring 42 would expand, allowing pin 46 to move to the end of arcuate slot 48 farther away from pin 44. Thus, as the rotation speed of gear 38 changes from minimum to maximum, pin 46 moves from one end of arcuate slot 48 to the other, and the relative angular positions of gear 38 and camshaft 12 shift accordingly.

Referring now to FIGURE 1, when crankshaft 16 rotates, timing chain 18 causes gear 38 to rotate, and spring 42 causes camshaft 12 to rotate, the angular position of camshaft 12 relative to the angular positions of gear 38 and crankshaft 16 varying according to rotation speed. Camshaft 12, in turn, controls the cams that open and close the engine intake and exhaust valves. At slow speeds, camshaft 12 is advanced from the split overlap position, providing advanced timing. At high speeds, camshaft 12 is retracted from the split overlap position, providing retarded timing. At medium speeds, camshaft 12 occupies the split overlap position as illustrated.

Figure 3:
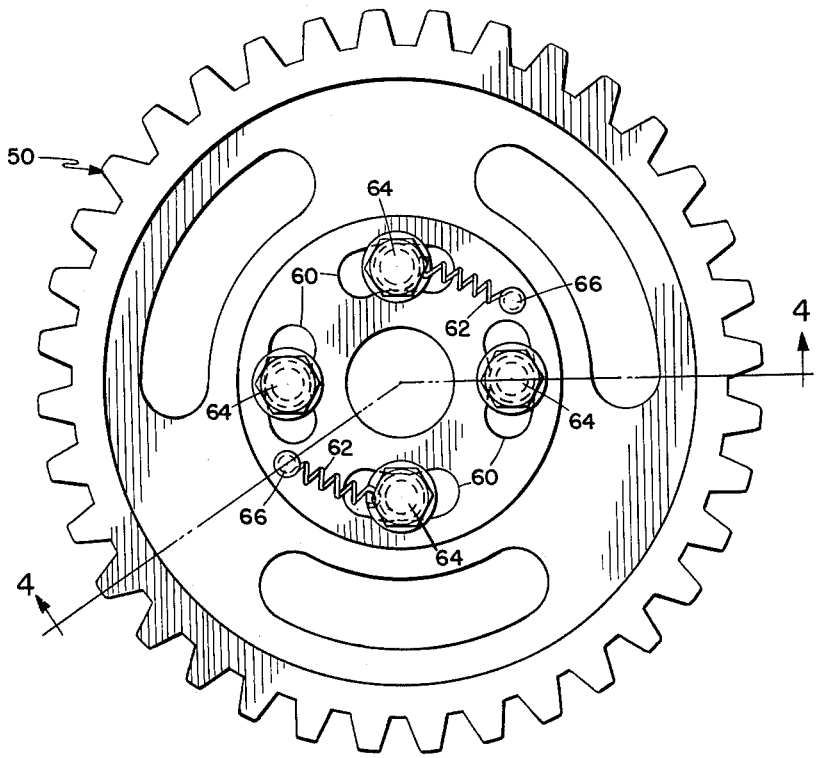
FIGURE 3 is a front elevation view of an alternative type of gear.
Figure 4:
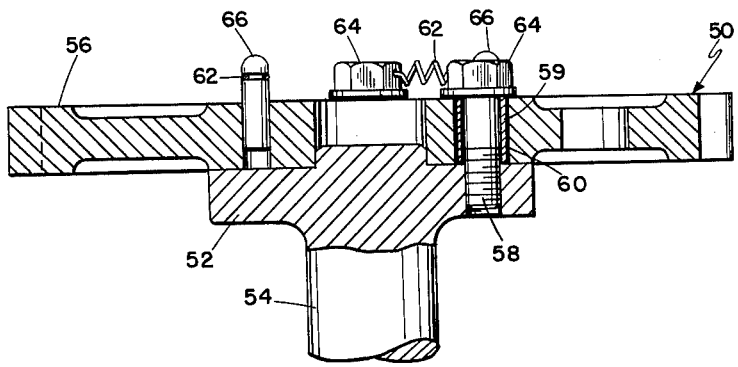
FIGURE 4 is a sectional view taken on line 4—4 of FIGURE 3.

A simplified embodiment of the instant invention is illustrated in FIGURES 3 and 4 in whch camshaft gear assembly 50 is composed of two pieces. Flange 52 is rigidly attached to camshaft 54 and camshaft gear 56 is slidably attached to flange 52 by bolts 58 in bushings 59. Bolts 58 protrude through arcuate slots 60 in gear 56. Springs 62 are attached at one end to boltheads 64 and at the other end to pins 66 in gear 56. Thus rotation of gear 56 is transferred by springs 62 to flange 52 and camshaft 54. Operation of this embodiment is the same as described above.

Figure 5:
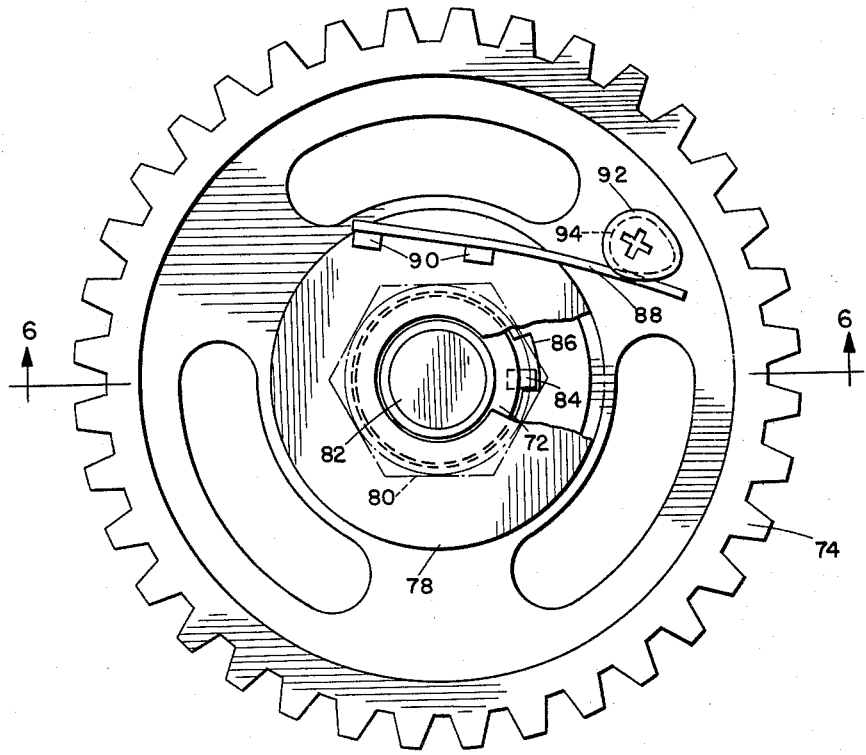
FIGURE 5 is a front elevation view of a further alteernative type of gear.
Figure 6:
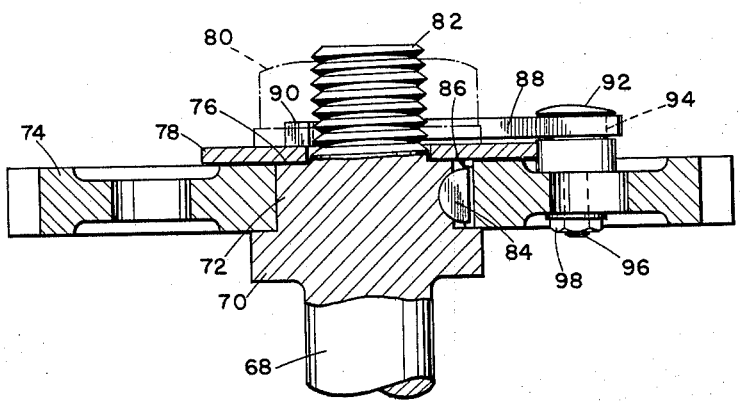
FIGURE 6 is a section on the line 6—6 of FIGURE 5.

FIGURES 5 and 6 illustrate a modification of the instant invention in which provision is made for relative movement directly between the camshaft gear and the camshaft. In this form camshaft 68 has a radially extending flange 70 adjacent the end thereof defining one side of a reduced portion 72 upon which is journalled, for limited rotation, a camshaft gear 74. Abutting against shoulder 76 of reduced portion 72 is a thrust washer 78 which overlaps the inner periphery of gear 74, as clearly shown. Thrust washer 78 is retained in position by a conventional nut 80 which is screw threaded on to the reduced end 82 of shaft 68. The distance between the thrust washer 78 and shoulder 70 is slightly greater than the thickness of the gear 74 to allow freedom of rotation of gear 74 relative to flange 70 and thrust washer 78.

A standard Woodruff key 84 is positioned in the reduced portion 92 of shaft 68. This key cooperates in the usual manner with a slot 86 in the inner periphery of gear 74. However slot 86 is elongated circumferentially, as shown in FIGURE 5 to permit limited relative rotation between the shaft 68 and gear 74. The degree of relative movement may be varied but I have found that 10° of relative movement will generally be sufficient.

As in the previously described form of the invention, the shaft 68 is resiliently coupled to gear 74. This is accomplished by securing one end of an elongated spring 88 to thrust washer 78 by weld lugs 90 or other suitable means. The other end of the spring is received in a peripheral groove 94 in an elliptical stop member 92 which is adjustably mounted on gear 74 in a suitable manner such as by a threaded shank 96 and nut 98, to vary the effective length and position of the spring 88, and thereby the tension of this spring. Spring 88 may be of any desired cross section and here shown as a conventional flat leaf spring. It will be readily apparent that rotation of the gear 74 in a clockwise direction will stress spring 88 to cause rotation of shaft 68, and that the desired degree of pretensioning of the spring 88 is readily accomplished by adjustment of the stop member 92. In other respects the operation of this embodiment of the invention is the same as that described above.

It is understood that minor variation from the form of the invention disclosed herein may be made without departure from the spirit and scope of the invention, and that the specification and drawing are to be considered as merely illustrative rather than limiting.

I claim:

1. In an internal combustion engine: a camshaft and a crankshaft; automatic valve timing apparatus, comprising:

a resilient drive coupling effectively between said crankshaft and said camshaft biasing the camshaft into a lag position relative to the crankshaft and retarding valve timing as said crankshaft is accelerated ond operated at increased r.p.m.

2. In an internal combustion engine having a camshaft and a crankshaft, automatic valve timing apparatus, comprising:

a camshaft gear assembly having an inner portion rigidly mounted on said camshaft and an outer portion operatively engaged with said crankshaft, said inner portion being in slidable contact with said outer portion as said camshaft rotates; and a bias spring having one end effectively connected to said inner portion and the other end effectively connected to said outer portion, rotation of said outer portion causing said inner portion and said camshaft to rotate by means of said bias spring, said bias spring flexing in proportion to inertia and torque and retarding the angular position of said inner portion and said camshaft as the crankshaft is accelerated and operated at increased rotational speed.

3. Apparatus according to claim 2 in which said camshaft gear assembly comprises:

an inner portion having a hub rigidly mounted on said camshaft, and annular face and back plates rigidly attached to the face and back of said hub on the outer perimeter thereof;

an outer portion comprising an annular toothed gear having a radially inwardly extending flange slidably inserted between said annular plates; said face plate having an arcuate slot therein;

a pin secured to said flange and extending through said arcuate slot; and a spring connected in tension between said face plate and said pin so as to bias said pin rotationally forward, relative to said face plate, toward one end of said arcuate slot, and whereby said spring permits said camshaft to lag when said crankshaft is accelerated and operated at increased r.p.m.

4. Apparatus according to clam 2 in which said camshaft gear assembly comprises:

an inner portion comprising a flange rigidly mounted on said camshaft; and an outer portion comprising a toothed gear mounted for rotational slippage relative to said flange.

5. In an internal combustion engine having a camshaft and a crankshaft, automatic valve timing apparatus, comprising:

a gear operatively connected to said crankshaft;

means operatively connecting said gear with said camshaft for limited relative rotation; and a camshaft lag-producing resilient coupling between said gear and said camshaft functioning to produce lag in the camshaft upon acceleration and increased rotational speed of the crankshaft.

6. The structure of claim 5 wherein said coupling is a spring, and further including means to adjust the tension of the spring.

7. The structure of claim 5 in which said first named means includes a key carried by and rotating with said camshaft and an elongated circumferential slot in said gear engaging said key.

8. The structure of claim 7 wherein said coupling is a spring, and including means to adjust the tension of the spring.

9. The structure of claim 8 in which said last named means comprises an elliptical stop member adjustably mounted on said gear and engaged by one end of said spring.

References Cited by the Examiner
UNITED STATES PATENTS

| | | | |
|---|---|---|---|
| 2,665,569 | 1/1954 | Ens | 74—395 |
| 2,829,507 | 4/1958 | Knudson | 64—25 |

DAVID J. WILLIAMOWSKY, *Primary Examiner.*

DON A. WAITE, *Examiner.*

R. BIRD, L. H. GERIN, *Assistant Examiners.*